July 15, 1941.  J. E. GRAY ET AL  2,249,469
ORIFICE ELEMENT FOR JOINTS
Filed Oct. 4, 1940
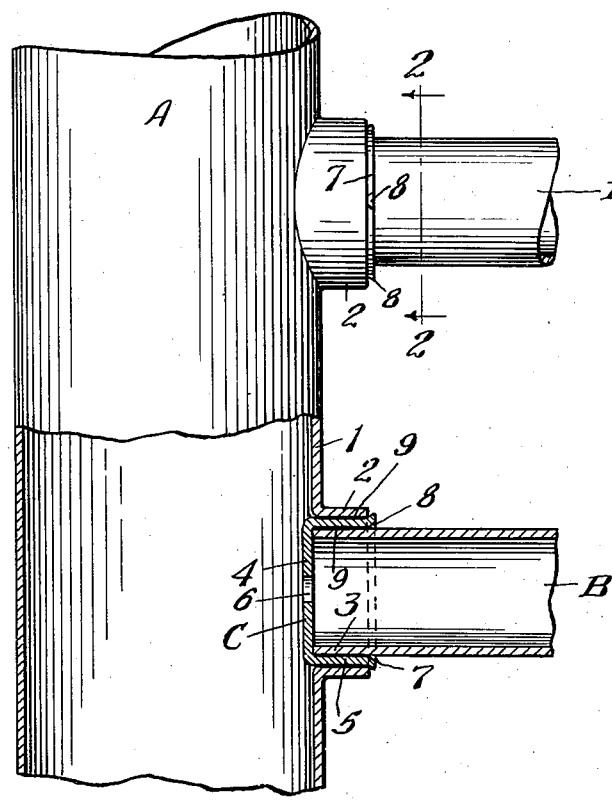
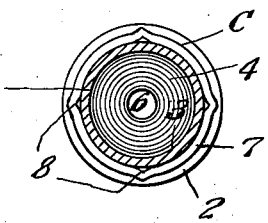
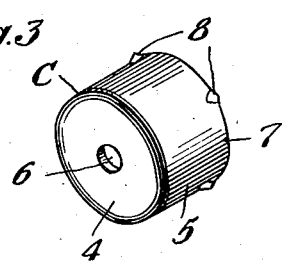
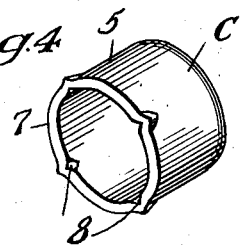
Inventors
John E. Gray
William M. Parker
By George J. Haight
Atty.

Patented July 15, 1941

2,249,469

UNITED STATES PATENT OFFICE 2,249,469

ORIFICE ELEMENT FOR JOINTS

John E. Gray and William M. Parker, Port Huron, Mich., assignors to Mueller Brass Co., Port Huron, Mich., a corporation of Michigan Application October 4, 1940, Serial No. 359,710

2 Claims. (Cl. 285—106)

This invention relates to the art of soldered joints between copper tube or pipe and fittings, and has more particular application where the fittings are made of wrought copper.

In certain instances it is desirable to control the flow of fluid through pipes by the provision of an orifice in the passage, of less diameter than that of the pipe passage. Heating coils made up of pipes or tubes joined to a common header is an example of apparatus in which it is desirable to provide an orifice at the point where the pipes or tubes communicate with the header.

The object of our invention is to provide an orifice element which can be permanently assembled in joints of the type in which the pipe is telescoped into the socket of the fitting and secured by solder flowed into the capillary space between the pipe and the internal wall of the socket.

In the accompanying drawing, the invention is illustrated in connection with the construction of a heating coil in which the flanged outlets of the header form the sockets into which the pipe or tube is telescoped and soldered.

Referring to the accompanying drawing which illustrates one embodiment of our invention, Fig. 1 is a view partly in elevation and partly in section of a header and pipes joined by soldered connections and showing our orifice element assembled in the joints;

Fig. 2 is a transverse section through one of the pipes or tubes on the line 2—2 of Fig. 1;

Figs. 3 and 4 are perspective views of our improved orifice device or element.

In fittings where the sockets are formed as straight cylindrical passages, particularly in wrought metal fittings in which the sockets are formed by drawing operations, it is difficult to mount or fasten an orifice element in the joint. The wrought metal header shown in the drawing is an example of this type of fitting.

The character A refers to a portion of a header of the wrought metal type having a series of lateral outlets to which the pipe or tubing B is connected. These outlets are openings in the wall 1 of the header, surrounded by integral cylindrical flanges 2 which form the sockets or female members into which the ends 3 of the pipe are telescoped to form the joints.

The orifice element C of our invention is in the form of a cup-shaped member having a bottom wall 4 and a cylindrical side wall 5. The bottom wall, when the member is in position, lies transversely of the passage through the pipe and has an orifice 6 of the desired diameter for the purpose. The cylindrical wall 5 is of such external diameter that it fits within the socket to provide capillary spacing between said wall and the socket wall for the reception of solder 9.

The external wall of the cup is provided with means which engage the outer rim of the socket wall flange 2 to limit the insertion of the cup into the socket. In the present structure this limit or stop means is a series of projections 8 formed by upsetting outwardly the metal at the rim 7 of the cup wall 5, so that only a small portion of the cup extends beyond the rim of the socket flange.

The cup when in place thus forms a socket for the end portion 3 of the pipe or tube B, and the bottom wall 4 thereof forms a stop to limit the insertion of the pipe. The internal diameter of the cup is so related to the external diameter of the pipe as to provide a space of capillary proportions between the respective surfaces of the cup wall and pipe for the reception of solder 9.

In assembling the structure, the orifice cup member is inserted into the socket of the header and the pipe inserted into the cup member, sufficient endwise pressure being exerted on the pipe to hold the parts seated in position while the joint is being made. The parts are then heated and solder or other suitable bonding material is then supplied to the capillary spaces between the socket and cup and between the cup and pipe in the usual method of forming joints of this type.

The orifice cup member is preferably formed integrally of a single piece of metal drawn or otherwise formed to the desired shape.

We claim:

1. In a structure of the class described, the combination of a header having an opening in its wall and a cylindrical flange surrounding the opening to form a communicating passage with said header, a cup-shaped member comprising a cylindrical tubular portion positioned within said flange and having a transverse wall at its inner end provided with an orifice, said cylinder portion having projections outstanding from its outer wall and bearing against the rim of the cylindrical flange, a pipe telescoped with said cylindrical portion with its end seated against the transverse wall, and solder sealing material between the flange and the cylindrical portion and between the cylindrical portion and the pipe.

2. As an article of manufacture for use in soldered fittings, an orifice element comprising a cup-shaped member made from a single piece of metal and having a bottom wall provided with an orifice of less area than the cross sectional area of the cup, and a cylindrical side wall adapted to telescope within the socket of a fitting and to receive interiorly the end portion of a metal tube, said bottom wall forming a stop to limit the insertion of said tube, and said cylindrical wall at the end opposite the bottom wall having upset portions forming projections outstanding from the outer surface of the wall to form stops to limit the insertion of the member into a fitting socket.

JOHN E. GRAY.
WILLIAM M. PARKER.